United States Patent
Ding Yuan et al.

(10) Patent No.: US 12,461,178 B2
(45) Date of Patent: Nov. 4, 2025

(54) METHOD FOR SUBJECT-SPECIFIC OPTIMIZATION OF A MULTI-BAND RF PULSE

(71) Applicant: Siemens Healthcare GmbH, Erlangen (DE)

(72) Inventors: Belinda Ding Yuan, Glasgow (GB); Iulius Dragonu, Harrow (GB); Raphael Tomi-Tricot, London (GB); Ali Aghaeifar, Tübingen (DE); Radhouene Neji, London (GB)

(73) Assignee: Siemens Healthineers AG, Forchheim (DE)

( * ) Notice: Subject to any disclaimer, the term of this patent is extended or adjusted under 35 U.S.C. 154(b) by 181 days.

(21) Appl. No.: 18/233,318

(22) Filed: Aug. 12, 2023

(65) Prior Publication Data
US 2024/0053420 A1 Feb. 15, 2024

(30) Foreign Application Priority Data
Aug. 12, 2022 (EP) .................................... 22190186

(51) Int. Cl.
*G01R 33/54* (2006.01)
*A61B 5/00* (2006.01)
*A61B 5/055* (2006.01)
*G01R 33/48* (2006.01)

(52) U.S. Cl.
CPC ............ *G01R 33/543* (2013.01); *A61B 5/055* (2013.01); *A61B 5/7257* (2013.01); *G01R 33/4822* (2013.01)

(58) Field of Classification Search
None
See application file for complete search history.

(56) References Cited

U.S. PATENT DOCUMENTS

| | | | |
|---|---|---|---|
| 2010/0156411 A1* | 6/2010 | Setsompop | G01R 33/4833 324/307 |
| 2012/0256626 A1* | 10/2012 | Adalsteinsson | G01R 33/5612 324/309 |

OTHER PUBLICATIONS

Padormo, Francesco, et al. "Parallel transmission for ultrahigh-field imaging." NMR in Biomedicine 29.9 (2016): 1145-1161.
(Continued)

*Primary Examiner* — Rodney E Fuller
(74) *Attorney, Agent, or Firm* — Lempia Summerfield Katz LLC (57) ABSTRACT

A method for optimization of an RF pulse that is multi-band. The RF pulse is a spokes RF pulse including a train of sub-pulses. The method includes using a starting k-space position as a current k-space position, and for each of slices to be excited by the RF pulse, performing: calculating a sub-pulse based on the current k-space position and calculating an expected magnetization after that sub-pulse; calculating an inverse Fourier transform of a difference between an expected magnetization and a target magnetization; and determining an optimal k-space position for a next spoke for this slice to be at a position where an absolute value of the inverse Fourier transform has a maximum. A next k-space position is determined for all slices together based on the optimal k-space positions determined for each slice individually. A multi-band RF pulse is determined based on the determined k-space positions.

18 Claims, 4 Drawing Sheets

(56) References Cited

OTHER PUBLICATIONS

Schmitter, Sebastian, et al. "Simultaneous multislice imaging in dynamic cardiac MRI at 7T using parallel transmission." Magnetic resonance in medicine 77.3 (2017): 1010-1020.
Setsompop, Kawin, et al. "Broadband slab selection with B mitigation at 7T via parallel spectral-spatial excitation." Magnetic Resonance in Medicine: An Official Journal of the International Society for Magnetic Resonance in Medicine 61.2 (2009): 493-500.
Setsompop, Kawin. Design algorithms for parallel transmission in magnetic resonance imaging. Diss. Massachusetts Institute of Technology, 2008. pp. 1-158.
Tse, Desmond HY, Christopher J. Wiggins, and Benedikt A. Poser. "High-resolution gradient-recalled echo imaging at 9.4 T using 16-channel parallel transmit simultaneous multislice spokes excitations with slice-by-slice flip angle homogenization." Magnetic resonance in medicine 78.3 (2017): 1050-1058.
Wu, Wenchuan, et al. "High-resolution diffusion MRI at 7T using a three-dimensional multi-slab acquisition." NeuroImage 143 (2016): 1-14.
Wu, Xiaoping, et al. "Human Connectome Project-style resting-state functional MRI at 7 Tesla using radiofrequency parallel transmission." Neuroimage 184 (2019): 396-408.
Yip, Chun-yu, Jeffrey A. Fessler, and Douglas C. Noll. "Advanced three-dimensional tailored RF pulse for signal recovery in T2*-weighted functional magnetic resonance imaging." Magnetic Resonance in Medicine: An Official Journal of the International Society for Magnetic Resonance in Medicine 56.5 (2006): 1050-1059.

* cited by examiner

METHOD FOR SUBJECT-SPECIFIC OPTIMIZATION OF A MULTI-BAND RF PULSE

This application claims the benefit of European Patent Application No. EP 22190186.1, filed on Aug. 12, 2022, which is hereby incorporated by reference in its entirety.

BACKGROUND

The present embodiments relate to subject-specific optimization of a multi-band RF pulse.

Ultra-high field magnetic resonance imaging offers improved signal-to-noise ratios and enhanced resolution compared to lower field strengths. However, at 7 T, the wavelength of the radiofrequency (RF) pulses that are necessary to excite the spins within the field-of-view approach the dimensions of the human head, resulting in increased B1+ inhomogeneity and signal dropouts.

One way to combat this increased inhomogeneity of the B1+ field generated by the RF coils is to use parallel transmission (pTx), which makes use of RF coils including multiple independent transmitters, such as an array coil. Each transmitter may correspond to an RF channel. In a pTx system, each RF channel is independent and may play RF pulses with different shapes, amplitudes, and phases. These additional degrees of freedom may be manipulated to improve excitation homogeneity.

For slice-selective excitation, spokes RF pulses are sometimes used. Spokes pulses consist of one or more slice-selective pulses played consecutively, interleaved with gradient blips. These gradient blips determine the transmit k-space locations of the spokes and have to be optimized to maximize excitation homogeneity. The principle of spokes is disclosed in F. Padormo et al.: "Parallel transmission for ultrahigh-filed imaging", NMR Biomed. 29(9): 1145-1161 (2016) as well as in the thesis by Kawin Setsompop "Design Algorithms for Parallel Transmission in Magnetic Resonance Imaging", Oxford University (2003), both of which are hereby incorporated by reference. A spokes pulse may also be applied in single channel RF transmission using a single RF coil, though a spoke pulse is often combined with pTx (e.g., multi-channel transmission).

In traditional single-band excitation, where each RF pulse excites one slab or slice, the positions of the spokes may be determined via an inverse Fourier transform method. This is a fast, computationally simple algorithm suited to designing subject-specific spokes pulses in real-time on the scanner. It has also been demonstrated that slice-specific optimization performs better than a whole-volume-based optimization when acquiring multiple slices across a volume. The inverse Fourier transform method is disclosed in Yip C-Y, Fessler J A, Noll D C: "Advanced three-dimensional tailored RF pulse for signal recovery in T2*-weighted functional magnetic resonance imaging", Magnetic Resonance in Medicine, 56(5): 1050-9 (2006).

However, this approach breaks down when considering simultaneous multi-slice (SMS) excitation, also known as multi-band (MB) excitation or pulses. This is because different slices will have different optimal spokes locations and different RF shim weightings (e.g., the amplitudes and phases with which the individual channels of a parallel transmission Rf coil are played).

Previous works have optimized static RF shims (e.g., amplitude and phase of the individual RF channels) for MB imaging in the brain, as described in Wu, X. et al., "Human Connectome Project-style resting-state functional MRI at 7 Tesla using radiofrequency parallel transmission," Neuroimage 184, 396-408 (2019), and Wu, W. et al., "High-resolution diffusion MRI at 7 T using a three-dimensional multi-slab acquisition," Neuroimage 143, 1-14 (2016). A similar approach for MB imaging in the heart is disclosed in Schmitter, S. et al., Simultaneous multi-slice imaging in dynamic cardiac MRI at 7 T using parallel transmission, Magn. Reson. Med. 77, 1010-1020 (2017). However, these works do not use spokes RF pulses, but only one sub-pulse without involving in-plane gradients.

SUMMARY AND DESCRIPTION

The scope of the present invention is defined solely by the appended claims and is not affected to any degree by the statements within this summary.

The present embodiments may obviate one or more of the drawbacks or limitations in the related art. For example, a method to optimize multi-band RF excitation pulses to compensate for patient-specific B1+ inhomogeneity. As another example, a method for calculating slice specific multi-band spokes RF pulses with optimal spokes locations to be designed is provided.

According to a first aspect of the present embodiments, a method for subject-specific optimization of a multi-band RF pulse for exciting spins within a field-of-view to obtain a target magnetization in a magnetic resonance imaging examination of a subject is provided. The RF pulse is a spokes RF pulse including a train of sub-pulses (e.g., spokes), interleaved with gradient blips. The gradient blips determine a trajectory of a magnetization in transmit k-space so that each sub-pulse is played at a specific position in transmit k-space. Each sub-pulse is to excite a predetermined number of slices simultaneously. The method includes a) receiving a starting k-space position and using the starting k-space position as a current k-space position. In b), for each of the slices to be excited by the RF pulse, the following acts are performed: i) calculating a sub-pulse based on the current k-space position and calculating an expected magnetization after that sub-pulse; ii) calculating the inverse Fourier transform of a difference between the expected magnetization and the target magnetization; and iii) determining an optimal k-space position for the next spoke for this slice to be at the position where the absolute value of the inverse Fourier transform has a maximum. In c), the next k-space position is determined for all slices together based on the optimal k-space positions determined for each slice individually. Optionally, in d) the performing in b) and the determining in c) are repeated with the next k-space position as the current spoke position, until a pre-determined number of spokes has been reached, until the difference between the expected magnetization and the target magnetization has reached a minimum, or until the relative change of the expected magnetization between two successive iterations is below a threshold. The multi-band RF pulse is calculated based on the determined k-space positions in c) and optionally d).

The RF pulse to be optimized is a "spokes RF pulse", as described in the reference by Padormo et al., in which a number of sub-pulses or spokes that each provide slice selectivity are interleaved with gradient blips, so that the transverse magnetization follows a defined trajectory in transmit k-space. Each sub-pulse, and therefore the RF pulse as a whole, is a multi-band pulse (e.g., is designed to excite a number of slices or slabs in the slice select direction). This makes it difficult to optimize the spokes locations in k-space, since the optimal k-space trajectory for each slice may be different. The term "slice" is meant to also incorporate "slabs" (e.g., thicker slices). The slice excited by each sub-pulse may have a thickness between 1 and 100 mm, between 2 and 50 mm, or between 3 and 10 mm. Each sub-pulse may be a summation of sinc pulses at different frequencies to realize a multi-band pulse.

The RF pulse may be used in the context of a magnetic resonance imaging examination of a subject such as a patient (e.g., of a certain body part of the subject). The body part may be the brain, heart, lungs, thorax, leg, arm, shoulder, or any other organ or body part of human. The RF pulse may be used in any type of magnetic resonance image acquisition sequence, such as spin-echo sequences and gradient-echo sequences (e.g., turbo spin-echo or FLASH).

The field-of-view excited by the multi-band RF pulse may include at least two slices through the body part (e.g., to 2 to 6 slices through the human head). The number of slices excited in one multi-band RF pulse is termed slice group herein.

The method performs a subject specific optimization, which provides that the RF pulse is optimized for each magnetic resonance imaging session, taking into account a B0-field map and/or a B1+ field map that has been obtained during the same imaging session on the field-of-view to be imaged using the multi-band RF pulse. In other words, the RF pulse is not optimized on a phantom or based on simulation, but the method performs a subject-specific spokes location optimization.

The method of the present embodiments presents an algorithm that extends the inverse Fourier method to multi-band pulses, allowing for slice specific multi-band spokes RF pulses with optimal spokes locations to be designed.

In detail, the method of the present embodiments uses a starting k-space position that may be predetermined, as the current k-space position. The method then performs an inverse Fourier optimization method for each slice separately. This is performed, for each slice in the slice group, by calculating a sub-pulse based on the current k-space position and calculating the expected magnetization, b, which is expected to result from this sub-pulse. The term "magnetization" is used herein to designate the transverse magnetization distribution over the respective slice. The magnetization b may be a 2D matrix or may be represented by a vector. The calculation of the sub-pulse may be done by a magnitude least squares (MLLS) method, as described in the review article by Padormo et al. Therein, a cost function term is minimized. The cost function is based on the sensitivity matrix S, which is constructed from the B1+ field information of all RF channels within the field-of-view, a vector w containing the complex weights to each channel, and a vector $b_{target}$ containing the desired B1+ field distribution. Other possible methods are the linear least squares method. These methods are known in the art and are sometimes termed "static" pTx optimization, because the methods optimize the complex weights with which each channel of a multichannel RF coil is to be driven, using the sensitivity matrix S derived from B1+ view maps, and using a certain constraint (e.g., a static constraint).

Once the expected magnetization distribution has been calculated, an inverse Fourier transform of the difference between the expected mechanization and the target magnetization is calculated. Again, each of expected magnetization and target magnetization is a distribution over the field-of-view, and may be represented by a vector. The distribution of the differences may be termed $b_{diff}$. A fast inverse Fourier transform (IFFT) algorithm may be used to perform the inverse FT. From the difference vector, the optimal k-space position for the next spoke for this slice is determined to be at the position where the absolute value of the inverse Fourier transform has a maximum. In other words, for the next sub-pulse, it is best to move to the k-space location of maximum distance to the target magnetization, so that the next sub-pulse will be applied at the k-space location where maximum correction is needed.

This is repeated for each slice in the slice group, where possibly, a different optimal k-space location for the next spoke will be determined for each slice.

The method of the present embodiments therefore determines the next k-space position (e.g., which is to be the same for all slices) based on the optimal k-space positions determined for each slice individually. In one embodiment, the optimal k-space position of every slice in this slice group is taken into account. This may be done in a number of ways, where, for example, each slice contributes to the next k-space position.

So far, the method has determined the k-space positions of two spokes (e.g., the spoke at the starting k-space position and a second spoke). In order to determine the k-space positions of further spokes, acts b and c may be repeated.

In embodiments, the number of spokes of the multi-band RF pulse is predetermined, and thus acts b and d are repeated a predetermined number of times (e.g., zero to four times). In another embodiment, the method stops when the difference between the expected magnetization and the target magnetization has reached a minimum. This minimum may be predetermined, and may relate to the absolute value of inverse Fourier transform of the difference. The minimum may, for example, be an average or a maximum of the absolute value of inverse Fourier transform over the difference magnetization distribution. In another embodiment, the method stops when the relative change of the expected magnetization between two successive iterations is below a threshold. The threshold may be predetermined.

Finally, the complete RF pulse, including all sub-pulses, is calculated/optimized based on the previously determined k-space positions of the spokes. This may be done by first optimizing the RF pulse for each slice using the determined spoke positions, and then combining the optimized single-band spokes pulses to give the final RF pulse. A suitable calculation method is, for example, disclosed in the above-cited paper by Padormo et al.: "Parallel transmission for ultrahigh-filed imaging", NMR Biomed. 29(9): 1145-1161 (2016). The optimization step generates a set of per-channel complex weights (e.g., amplitude and phase) for each spoke. According to an embodiment, a magnitude least square cost function may be used, but it is possible to use other cost functions (see table 1 of the Padormo paper).

The method of the present embodiments thereby applies an iterative inverse Fourier method to multi-band spokes RF pulse design.

According to an embodiment, the next k-space position for all slices together is determined by calculating a weighted mean of the optimal k-space positions determined for each slice individually. In other words, the method takes a weighted mean of the position of the spokes in the individual slices and uses the weighted mean for the final multi-band RF pulse design. This has the advantage that each slice contributes to the final multi-band RF pulse design. The weighting may be adjusted such that the overall RF pulse is optimized to obtain the best possible B1+ homogeneity over all slices in the slice group.

According to an embodiment, the weight of each individual slice in the weighted mean is the same (e.g., 1/Number of Slices). In other words, the mean position of all slices is calculated from the optimal k-space position determined for each slice. Thereby, each slice is weighted equally, which is a good approach if each slice is considered equally important.

According to an alternative embodiment, the weight of each individual slice in the weighted mean is proportional to the number of tissue pixels in the individual slice. Thus, each slice may be weighted by the number of pixels in the image mask for that slice. The image mask may represent the outer boundary of the body part, as visible on that slice. This embodiment is useful when slices through the body part have considerably differing sizes, as, for example, in axial slices through the head. The slices nearer the crown of the head have a smaller image mask, and therefore may be given less weight in the weighted mean.

According to another embodiment, the weight of each individual slice in the weighted mean is proportional to the amplitude of the maximum inverse Fourier transform of that slice. For example, the IFFT amplitude-weighted mean of the positions of the spokes across all slices in the slice group may be taken. Thereby, those slices that have the largest amplitude of the maximum inverse Fourier transform, and thus are furthest from the target magnetization, are given more weight than those where the difference between the expected magnetization and the target magnetization is smaller. This method may also provide very fast optimization, requiring few spokes in the multi-band RF pulse.

According to yet another embodiment, the next k-space positions for all slices together is determined in act c by taking the optimal k-space position of the slice that has the largest maximum inverse Fourier transform. This may be considered a simplified version of the previous embodiment, since the slice having the largest maximum is used to determine the next spoke position. "Large" may refer to the absolute value of the maximum inverse Fourier transform of that slice.

The method of the present embodiments may be useful in single-channel RF pulse design. In one embodiment, the method is used in multi-channel RF pulse design. The method may include an act of receiving a subject-specific B1 field map or B1+ field map of the field-of-view, where the RF pulse is a parallel transmission pulse and where the sub-pulses of the RF pulse are calculated by optimizing the weights, with which individual channels of a parallel transmission RF coil are driven, based on the B1+ field map.

According to an embodiment, the starting k-space position is predetermined. Thereby, no further optimization has to be done. In an embodiment, the starting k-space position is at the center of k-space. Most spokes RF pulses include one spoke at the center of k-space; however, this is no absolute requirement. One may also start at a predetermined position close to the center of k-space, or possibly two or three spokes may have predetermined positions close to the center of k-space.

According to an embodiment, the method stops once a predetermined number of spokes positions has been determined (e.g., including the starting position), where the predetermined number may be 2 to 6, 2 to 4, or 2 to 3. It has been shown that very good B1+ field homogeneity may be reached even with as few spokes as that.

According to an embodiment, the predetermined number of slices to be excited by the multi-band RF pulse is 2 to 16, 2 to 8, or 2 to 4. These are numbers of slices that may be realized within one slice group with still satisfactorily homogenous RF excitation over the slice group.

According to a further aspect of the present embodiments, a computer program that includes program code that causes a computer to carry out the method as described herein, when the computer program is executed on a computer, is provided. The computer may include a control unit for a magnetic resonance imaging system, as described herein below. The computer program may be written in any known programming language. The programming language may be a programming language that is used on MRI systems to calculate/optimize RF pulses.

According to a further aspect, a non-transient computer-readable medium including a computer program as described herein is provided. The non-transient computer-readable medium may, for example, be any digital storage medium, such as a hard drive, a server, a cloud, a computer, an optical and/or magnetic storage medium, a CD-ROM, an SSD, an SD card, a DVD, a Blu-ray disc, and/or a USB stick. All features and advantages of the method may be adapted to the computer-readable medium and vice versa.

According to further aspect of the present embodiments, a control unit for a magnetic resonance imaging system is provided. The control unit is configured to carry out the method according to the present embodiments. The control unit may be any calculating unit, such as a CPU or GPU, and may be part of the computer, server, cloud computer, etc. The control unit may, for example, be part of the hardware used to control the MRI system. The control unit may also be part of a mobile device such as a laptop, tablet computer, or smartphone.

The present embodiments are also directed to a magnetic resonance imaging system including a control unit as described herein. In useful embodiments, the MRI system operates at high static magnetic field strength, such as 3 T or above, such as 3 T to 12 T or 5 T to 7 T. However, a low field scanner (e.g., operating at 1.5 T) may also profit from the present embodiments.

All features and advantages of the method may be adapted to the control unit and the MRI system, and vice versa.

DETAILED DESCRIPTION

Figure 1:
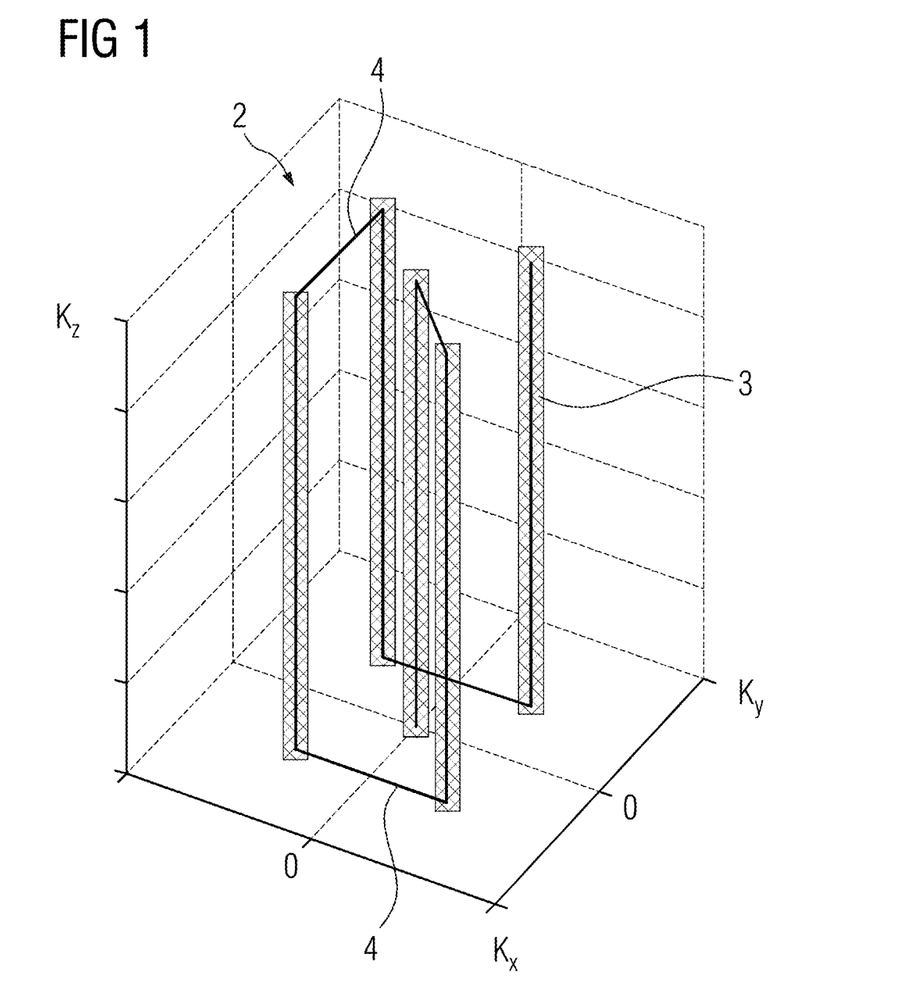
FIG. 1 shows a schematic diagram of an example spokes RF pulse.

FIG. 1 depicts a k-space trajectory of a spokes RF pulse 2. A slice select direction is z, so each sub-pulse 3 is played simultaneously with a slice select gradient in z-direction, and therefore, a trajectory during the sub-pulses 3 runs parallel to a direction $k_z$ in k-space, as depicted in FIG. 1. The depicted spokes RF pulse 2 has five spokes, one at a center of k-space where $k_x$ and $k_y$ are 0. In between the spokes 3, gradient blips in an in-plane direction $k_x$ and $k_y$ are played, resulting in trajectory segments 4 that connect the spokes 3 in the $k_x$-$k_y$-plane. According to a method of the present embodiments, an exact position in the $k_x$-$k_y$-plane of the spokes 3 (e.g., of the spokes 3 that are not in the center of k-space) is optimized in a patient specific way for multiple slices that are excited with the spokes RF pulse 2 simultaneously.

Figure 2:
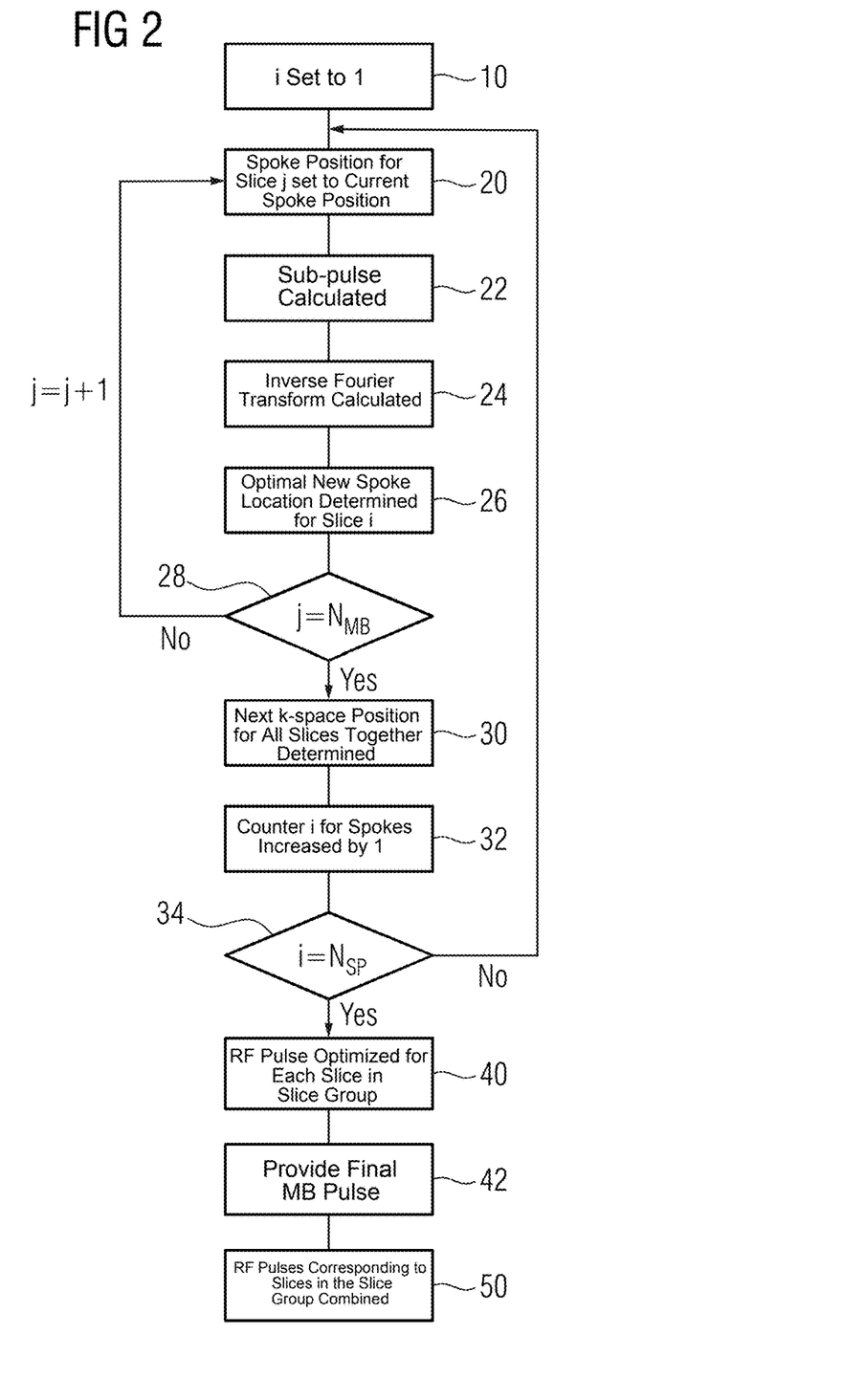
FIG. 2 shows a flow diagram of a method according to an embodiment.

An example of an algorithm that embodies a method according to an embodiment is depicted in FIG. 2. The method is applied to optimizing a multi-band RF pulse with an MB factor of $N_{MB}$, which is a number of slices excited simultaneously with one RF pulse. If a total number of slices to be imaged is $N_{sl}$, there will be a total of $N_{sl}/N_{MB}=N_{slgp}$ 'slice groups', each requiring an RF excitation pulse. For each slice group, i, where $i \in N_{slgp}$, $N_{MB}$ slices are to be excited at the same time. The method described may be considered as a workflow for designing an MB pulse for a single slice group.

In the $1^{st}$ step 10, i is set to 1 (e.g., a first spoke). The starting k-space position is taken as a current k-space position (also referred to as spoke position) for i=1; in this case, the starting k-space position is predetermined to be at the center of k-space: $\mathbb{K}_1 = \{(0, 0)\}$ The next steps 20 to 26 will be repeated for each slice j in the slice group.

In step 20, the spoke position for the slice j, $\mathbb{J}_{j,i}$ is set to equal the current spoke position $\mathbb{K}_i$: $\mathbb{J}_{j,i} = \mathbb{K}_i$.

In step 22, a sub-pulse is calculated by designing an RF shim based on spoke position, $\mathbb{J}_j$, and the resultant expected magnetisation, b, is calculated.

In step 24, the inverse Fourier transform of the difference between resultant expected magnetization and target magnetization is calculated for slice j: $\mathrm{IFFT}(b - b_{target}) = \mathrm{IFFT}(b_{diff})$.

In step 26, the optimal new spoke location $(k_x, k_y)$ for slice I is determined by the location coordinates of $\max(\mathrm{abs}(\mathrm{IFFT}(b_{diff})))$. The optimal new spoke position for slice j is set to this k-space location $\mathbb{J}_{j,i+1} = \{(k_x, k_y)\}$.

At 28, if $j \ne N_{MB}$, the algorithm increments i by 1 and goes back to step 20, to repeat steps 22 to 28 for the next slice in the slice group.

If $j = N_{MB}$ (e.g., if the optimal new spoke location has been determined for all slices), the algorithm proceeds to step 30. In step 30, the next k-space position for all slices together is determined based on the optimal k-space positions for each slice. There are a number of ways of doing this. According to one embodiment, the mean of the optimal new spoke positions for all slices is calculated and used for the final multi-band pulse design:

$$\mathbb{K}_{i+1} = \frac{1}{N_{MB}} \sum_{j=1}^{N_{MB}} \mathbb{J}_{j,i+1}.$$

In step 32, the counter i for the spokes is increased by 1 (e.g., i=i+1).

In step 34, it is determined whether the maximum predetermined number of spokes for the pulse has been reached (e.g., if $i = N_{sp}$). If no, the algorithm jumps back to step 20, using the determined optimal new spoke position of all slices $\mathbb{K}_{j+1}$ as the current k-space position.

This is repeated until $i = N_{sp}$, where $N_{sp}$ spokes is a pre-determined number of spokes of the RF pulse.

The method then moves on to step 40, in which, for each slice j in the slice group, the RF pulse, $P_j$, is optimized for $N_{sp}$ spokes with spoke positions $\mathbb{K}$.

In step 50, the RF pulses $P_1$ corresponding to each slice j in the slice group are combined $P_j \forall j \in [1, N_{MB}]$ to give the final MB pulse, P.

Step 30 has a number of different embodiments. According to a $2^{nd}$ embodiment, the mean of the optimal spokes position in the individual slices is not taken as next spoke position. Rather, the spokes location corresponding to the largest Fourier transform residue in the slice group is taken.

An example workflow corresponding to this embodiment is described below.

Set i=1 (i.e. the first spoke); and $\mathbb{K}_1 = \{(0, 0)\}$ (Step 10)
repeat
    For each slice j in the slice group:
        Set $\mathbb{J}_{j,i} = \mathbb{K}_i$ (step 20).
        Design RF shim based on spoke positions, $\mathbb{J}_j$, and calculate the resultant expected magnetisation, b (step 22).
        Calculate the inverse Fourier transform of the difference between current magnetization and target magnetization: $\mathrm{IFFT}(b - b_{target}) = \mathrm{IFFT}(b_{diff})$ (step 24).
        New spoke location $(k_x, k_y)$ is determined by the location coordinates of $\max(\mathrm{abs}(\mathrm{IFFT}(b_{diff})))$ and $\mathbb{J}_{j,i+1} = \{(k_x, k_y)\}$ (step 24).
    Alternative step 30: Set $\mathbb{A}_{j,i} = \max(\mathrm{abs}(\mathrm{IFFT}(b_{diff})))$;
Find $$J = \underset{j}{\mathrm{argmax}}(\mathbb{A}_{j,i})$$

to determine which slice in the slice group has the largest $\max(\mathrm{abs}(\mathrm{IFFT}(b_{diff})))$;
Set $\mathbb{K}_{i+1} = \mathbb{J}_{J,i+1}$
i=i+1 (step 32).
until $i = N_{sp}$ (step 34).
For each slice j in the slice group:
    Optimize RF pulse, $P_j$, for $N_{sp}$ spokes with spoke positions $\mathbb{K}$ (step 40).
Combine $P_j \forall j \in [1, N_{MB}]$ to give the final MB pulse, P (step 42).

Two further embodiments of the MB spokes design algorithms are described below, in which step 30 may be varied as follows.

According to a third embodiment, an ROI-weighted mean of positions of the spokes are taken across all slices in the slice group, for example, setting $$\mathbb{K}_{i+1} = \frac{1}{N_{MB}} \sum_{j=1}^{N_{MB}} \mathbb{J}_{j,i+1} \times \frac{W_j}{W},$$

where $W_j$ is the number of pixels in the image mask for slice j, and $W = \sum_{j=1}^{N_{MB}} W_j$.

According to a fourth embodiment, the IFFT amplitude-weighted mean of the positions of the spoke across all slices in the slice group is taken, for example, setting $$\mathbb{K}_{i+1} = \frac{1}{N_{MB}} \sum_{j=1}^{N_{MB}} \mathbb{J}_{j,i+1} \times \frac{A_{j,i}}{A},$$

where $W_j$ is the number of pixels in the image mask for slice j, and $A = \sum_{j=1}^{N_{MB}} \mathbb{A}_{j,i}$.

The four embodiments for determining the next k-space position based on the optimal k-space positions determined for each slice individually were compared with each other and with the performance of an optimized single-band RF pulse. Magnetic resonance imaging of the brain was performed on six healthy volunteers using the multi-band RF pulses calculated according to the four embodiments, and a single-band RF pulse. The optimization method was performed using whole-brain per-channel $B_1^+$ and $\Delta B_0$ maps obtained from the six volunteers. The following pulse design parameters were used: MB factor=2; target flip angle (FA) =30°; number of spokes=2 (2.56 ms per pulse, Hanning-filtered sinc). No constraints were applied to the overall peak voltage of the pulse.

Figure 3:
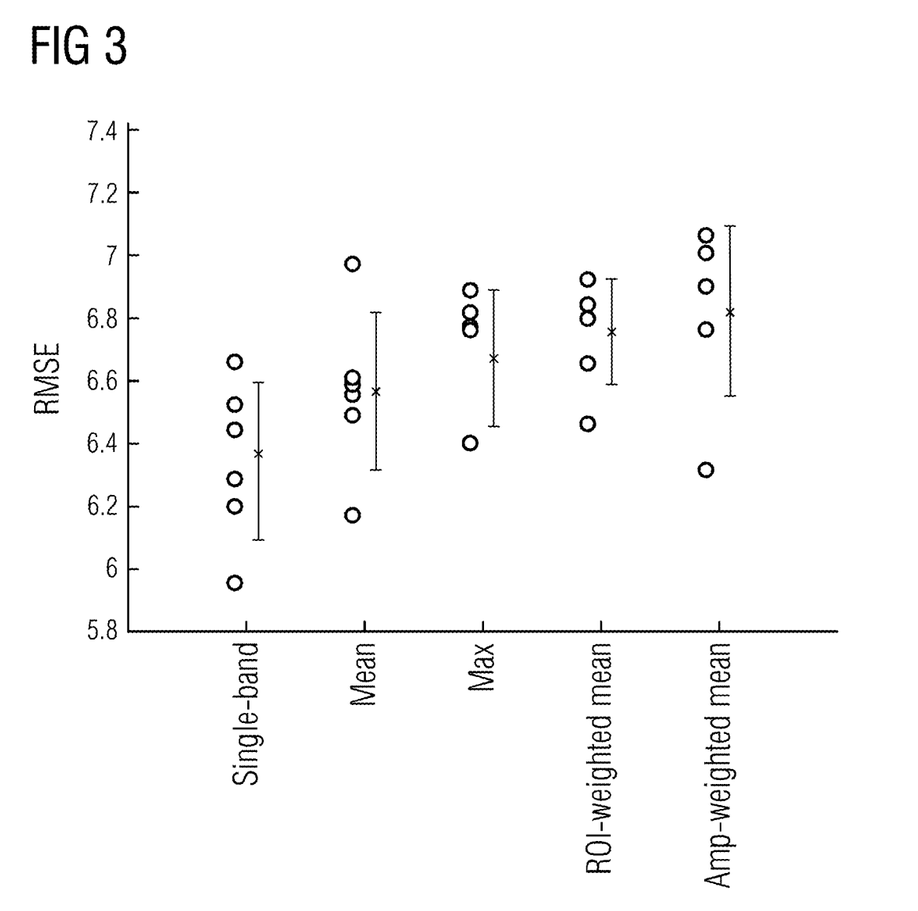
FIG. 3 shows a graph of root-mean-square errors for different embodiments of the optimization method across six volunteers.

The result of the comparison is shown in FIG. 3, which depicts the root-mean-square error (RMSE) across the whole brain for all volunteers across five different optimization methods. Each dot represents a volunteer, while the black crosses and error bars represent the mean and standard deviation RMSE values respectively. Taking the mean spoke locations across the simultaneously excited slices yielded the smallest RMSE values out of the four embodiments of the MB spokes location optimization method. To quantify the differences, especially between the prior art single-band optimization method and the embodiments, four paired Student's t-tests were performed using 'mean' as a reference. There were no significant differences between the single-band optimization method and taking the mean spokes location in MB optimization, implying that it has a good performance.

In other words, the method of the present embodiments has been shown to have extremely good performance, since the RMSE is comparable to the single-band pulse optimization, which naturally results in RF pulses that require much longer acquisition times, since multi-slice excitation is not possible.

Figure 4:
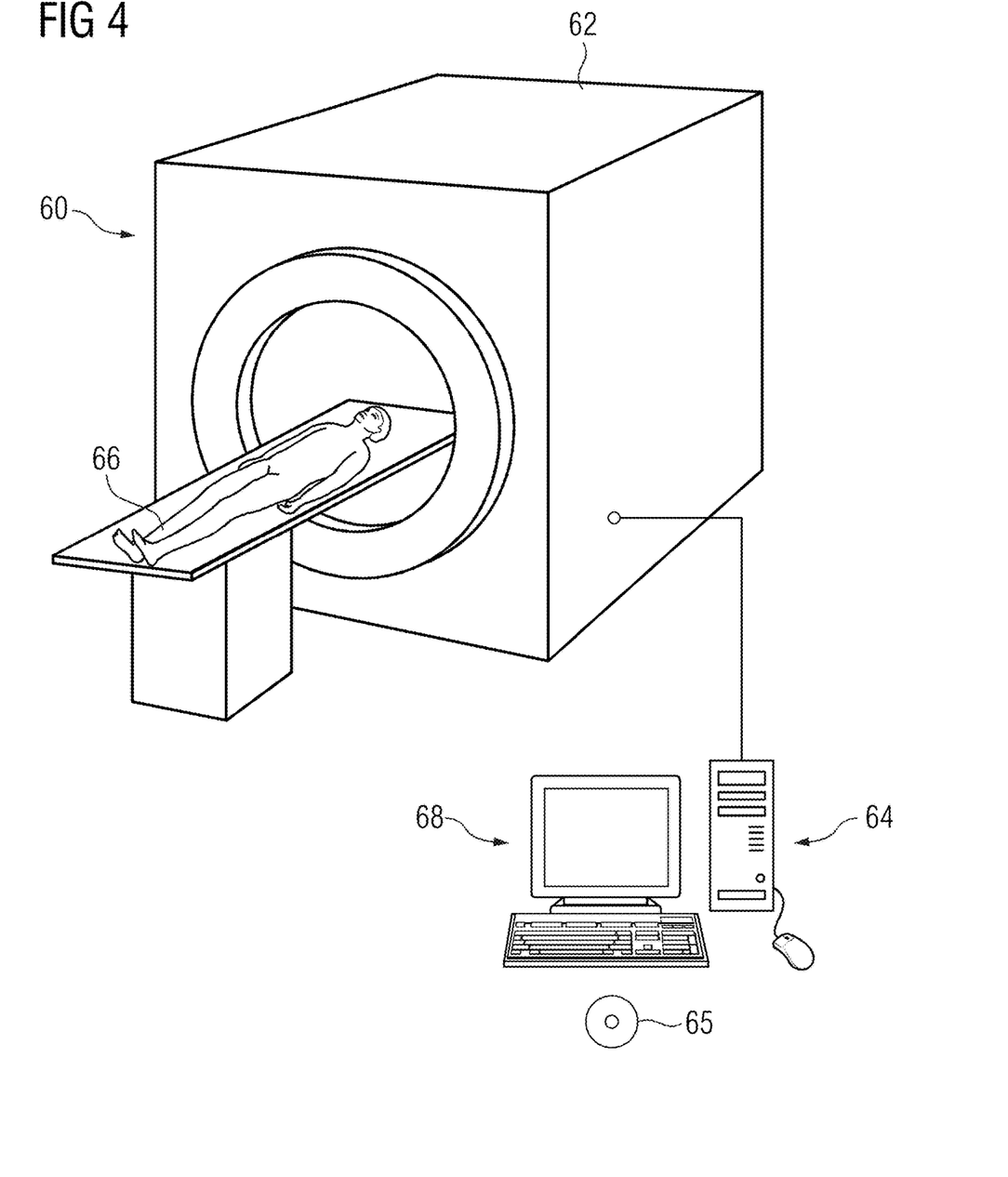
FIG. 4 shows a schematic representation of an MRI system according to an embodiment.

FIG. 4 shows an embodiment of a magnetic resonance imaging system 60 according to the present embodiments. The magnetic resonance imaging system 60 includes a magnetic resonance scanner 62 and a control unit 64. The control unit 64 is configured to receive B1+ field maps and to perform the multiband RF pulse optimizations described herein. A User may interact with the control unit 64 via a user interface 68, which may include a screen and a keyboard, and the control unit 64 is configured to output information and/or suggestions via an output device of the user interface 68 and to receive user input via a user input device of the user interface 68. A computer program according to the present embodiments may be stored on disc 65 and loaded into the control unit 64.

The method of the present embodiments extends the iterative inverse Fourier method used in single-band spokes pulse design to multi-band spokes design. According to an embodiment, the method takes the mean of the position of the spokes in the individual slices and uses it for the final MB pulse design.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for subject-specific optimization of an RF pulse for exciting spins within a field-of-view to obtain a target magnetization in a magnetic resonance imaging examination of a subject, the RF pulse being a multi-band RF pulse, wherein the RF pulse is a spokes RF pulse comprising a train of sub-pulses interleaved with gradient blips, wherein the gradient blips are configured to determine a trajectory of a magnetization in transmit k-space so that each sub-pulse is played at a specific position in transmit k-space, and wherein each sub-pulse is configured to excite a predetermined number of slices simultaneously, the method comprising:
receiving a starting k-space position and using the starting k-space position as a current k-space position;
for each of the slices to be excited by the RF pulse, performing:
calculating a sub-pulse based on the current k-space position and calculating an expected magnetization after that sub-pulse;
calculating an inverse Fourier transform of a difference between the expected magnetization and the target magnetization;
determining an optimal k-space position for a next spoke for the respective slice to be at a position where an absolute value of the inverse Fourier transform has a maximum;
determining a next k-space position for all slices together based on the optimal k-space positions determined for each slice individually; and
calculating a multi-band RF pulse based on the determined k-space positions.

2. The method of claim 1, further comprising:
repeating the performing and the determining of the next k-space position for all slices together with the next k-space position as the current spoke position, until a predetermined number of spokes has been reached, until the difference between the expected magnetization and the target magnetization has reached a minimum, or until a relative change of the expected magnetization between two successive iterations is below a threshold,
wherein calculating the multi-band RF pulse is based on the k-space positions determined in the determining of the next k-space position for all slices together and the repeating of the performing and the determining of the next k-space position for all slices together.

3. The method of claim 2, wherein the predetermined number of spokes within the RF pulse is 2 to 6.

4. The method of claim 3, wherein the predetermined number of spokes within the RF pulse is 2 to 4.

5. The method of claim 4, wherein the predetermined number of spokes within the RF pulse is 2 to 3.

6. The method of claim 1, wherein determining the next k-space position for all slices together comprises calculating a weighted mean of the optimal k-space positions determined for each slice individually.

7. The method of claim 6, wherein a weight of each individual slice in the weighted mean is the same.

8. The method of claim 6, wherein a weight of each individual slice in the weighted mean is proportional to a number of tissue pixels in the individual slice.

9. The method of claim 6, wherein a weight of each individual slice in the weighted mean is proportional to an amplitude of the maximum inverse Fourier Transform of that slice.

10. The method of claim 1, wherein determining the next k-space position for all slices together comprises taking the optimal k-space position of the slice that has a largest maximum inverse Fourier transform.

11. The method of claim 1, further comprising receiving a subject-specific B1-field map of the field-of-view,
wherein the RF pulse is a parallel transmission pulse, and
wherein calculating the sub-pulses of the RF pulse comprises optimizing weights, with which individual channels of a parallel transmission RF coil are driven, based on a B1-field map.

12. The method of claim 1, wherein the starting k-space position is predetermined, is at a center of k-space, or a combination thereof.

13. The method of claim 1, wherein the predetermined number of slices to be excited by the multi-band RF pulse is 2 to 16.

14. The method of claim 13, wherein the predetermined number of slices to be excited by the multi-band RF pulse is 2 to 8.

15. The method of claim 14, wherein the predetermined number of slices to be excited by the multi-band RF pulse is 2 to 4.

16. In a non-transitory computer-readable storage medium that stores instructions executable by a control unit of a magnetic resonance imaging system for subject-specific optimization of an RF pulse for exciting spins within a field-of-view to obtain a target magnetization in a magnetic resonance imaging examination of a subject, the RF pulse being a multi-band RF pulse, wherein the RF pulse is a spokes RF pulse comprising a train of sub-pulses interleaved with gradient blips, wherein the gradient blips are configured to determine a trajectory of a magnetization in transmit k-space so that each sub-pulse is played at a specific position in transmit k-space, and wherein each sub-pulse is configured to excite a predetermined number of slices simultaneously, the instructions comprising:
  receiving a starting k-space position and using the starting k-space position as a current k-space position;
  for each of the slices to be excited by the RF pulse, performing:
    calculating a sub-pulse based on the current k-space position and calculating an expected magnetization after that sub-pulse;
    calculating an inverse Fourier transform of a difference between the expected magnetization and the target magnetization; and
    determining an optimal k-space position for a next spoke for the respective slice to be at a position where an absolute value of the inverse Fourier transform has a maximum;
  determining a next k-space position for all slices together based on the optimal k-space positions determined for each slice individually; and
  calculating a multi-band RF pulse based on the determined k-space positions.

17. A control unit for a magnetic resonance imaging system, the control unit comprising:
  a processor configured for subject-specific optimization of an RF pulse for exciting spins within a field-of-view to obtain a target magnetization in a magnetic resonance imaging examination of a subject, the RF pulse being a multi-band RF pulse, wherein the RF pulse is a spokes RF pulse comprising a train of sub-pulses interleaved with gradient blips, wherein the gradient blips are configured to determine a trajectory of a magnetization in transmit k-space so that each sub-pulse is played at a specific position in transmit k-space, and wherein each sub-pulse is configured to excite a pre-determined number of slices simultaneously, the processor being configured for subject-specific optimization of the RF pulse comprising the processor being configured to:
  receive a starting k-space position and using the starting k-space position as a current k-space position;
  for each of the slices to be excited by the RF pulse, perform:
    calculation of a sub-pulse based on the current k-space position and calculation of an expected magnetization after that sub-pulse;
    calculation of an inverse Fourier transform of a difference between the expected magnetization and the target magnetization; and
    determination of an optimal k-space position for a next spoke for the respective slice to be at a position where an absolute value of the inverse Fourier transform has a maximum;
  determine a next k-space position for all slices together based on the optimal k-space positions determined for each slice individually; and
  calculate a multi-band RF pulse based on the determined k-space positions.

18. A magnetic resonance imaging system comprising:
a control unit comprising:
  a processor configured for subject-specific optimization of an RF pulse for exciting spins within a field-of-view to obtain a target magnetization in a magnetic resonance imaging examination of a subject, the RF pulse being a multi-band RF pulse, wherein the RF pulse is a spokes RF pulse comprising a train of sub-pulses interleaved with gradient blips, wherein the gradient blips are configured to determine a trajectory of a magnetization in transmit k-space so that each sub-pulse is played at a specific position in transmit k-space, and wherein each sub-pulse is configured to excite a pre-determined number of slices simultaneously, the processor being configured for subject-specific optimization of the RF pulse comprising the processor being configured to:
  receive a starting k-space position and using the starting k-space position as a current k-space position;
  for each of the slices to be excited by the RF pulse, perform:
    calculation of a sub-pulse based on the current k-space position and calculation of an expected magnetization after that sub-pulse;
    calculation of an inverse Fourier transform of a difference between the expected magnetization and the target magnetization; and
    determination of an optimal k-space position for a next spoke for the respective slice to be at a position where an absolute value of the inverse Fourier transform has a maximum;
  determine a next k-space position for all slices together based on the optimal k-space positions determined for each slice individually; and
  calculate a multi-band RF pulse based on the determined k-space positions.

* * * * *